Aug. 25, 1931. M. DAINOW 1,820,731

MOTION PICTURE REWINDING MECHANISM

Filed Dec. 6, 1929

INVENTOR
Max Dainow
BY
Mock & Blum
ATTORNEYS

Patented Aug. 25, 1931

1,820,731

UNITED STATES PATENT OFFICE

MAX DAINOW, OF WEST NEW YORK, NEW JERSEY

MOTION PICTURE REWINDING MECHANISM

Application filed December 6, 1929. Serial No. 412,132.

This invention relates to improvements in rewinding mechanism for motion pictures and more particularly to take up reels for rewinding motion picture films after exhibition of the same.

A particular object of the invention is the provision of a satisfactory take-up reel for miniature or toy motion picture film mechanisms.

Another object of the invention is the provision of a satisfactory take-up reel for rewinding miniature motion picture films.

Further objects of this invention will be apparent from the specification and drawings in which Fig. 1 is a side elevation showing two of the reels in use with a diagrammatic representation of the motion picture mechanism in combination with which they are employed. The handles of both reels are shown in the inoperative position.

Figure 1:
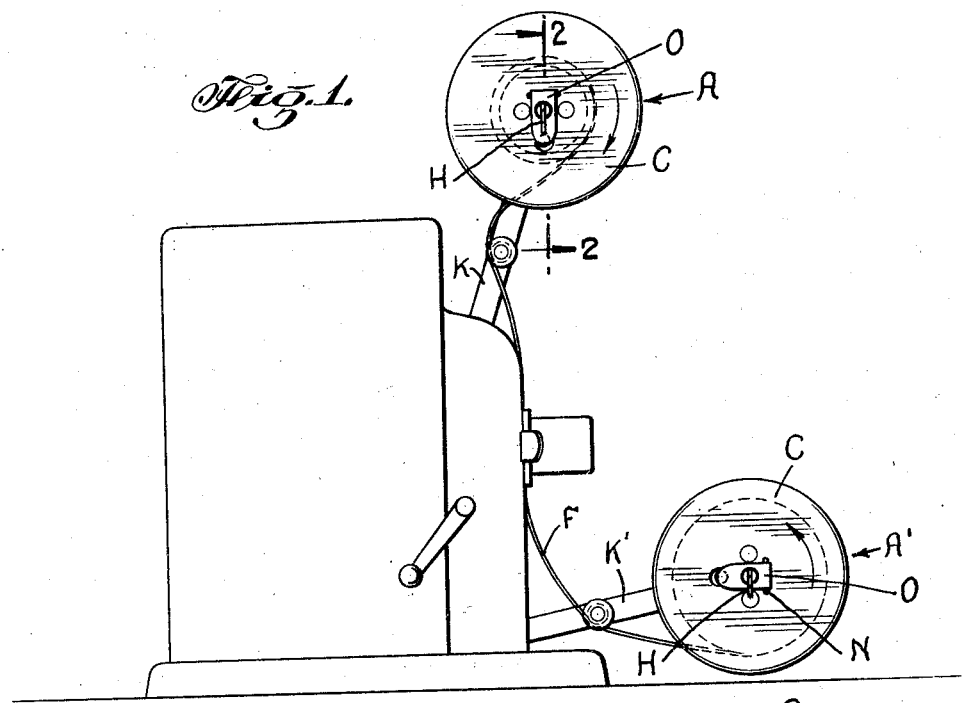

I have shown the motion picture projector mechanism itself only in diagrammatic outline in Fig. 1, as I use the standard mechanism for the exposure of the film, and claim no novelty in the form of mechanism used.

I employ for the film itself two reels of like construction A and A', each having a wooden spindle B on which the film F is wound. The shaft of reel A' is held by arm K' and the shaft of reel A is held by arm K. The spindle B is riveted to the side plates C of the reel, so that the spindle and said side plates turn in unison. Through the center of the reel is a cylindrical opening D serving as the bearing for the pin E which supports the reel in winding and unwinding the film. The reel turns independently of said pin E.

Figure 2:
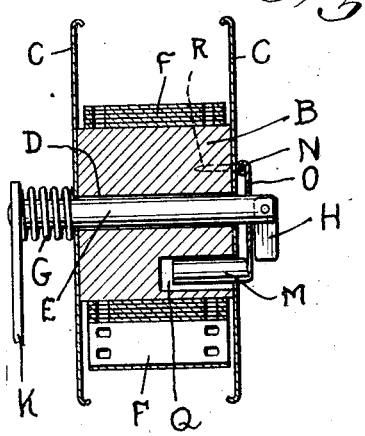
Fig. 2 is a vertical section along the line 2—2 of Fig. 1 showing my improved motion picture reel.

Fig. 2 shows my improved reel in the position while the reel is being unwound.

Figure 4:
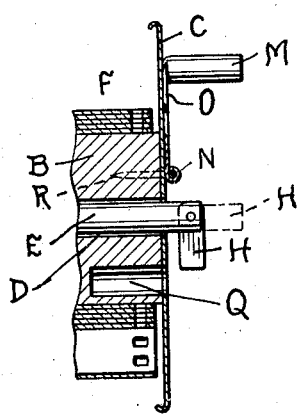
Fig. 4 is a partial vertical section broken away and in operative position showing the handle of the reel in the operation of rewinding the film on the upper reel shown in Fig. 1.

Fig. 4 shows the same reel in the reverse position while the film is being rewound, both Figs. 2 and 4 illustrating the top reel A shown in Fig. 1.

The pin E has a spring G mounted one end thereof. The other end of said pin is provided with a pivoted stop H so that when the stop H is perpendicular to shaft E, the reel E cannot be removed from the pin. The spring G maintains the reel in the position shown in Fig. 2.

As more clearly shown in Figs. 2 and 4, the particular feature of my invention is the handle M hinged at N to the pin R which is connected to the spindle B. This handle M has the perforated arm and the outer end of shaft E can pass through the perforation in member O as clearly shown in Fig. 2.

Fig. 2 shows my improved reel with the film being unwound therefrom so that the crank handle M is nested inside the body of the spindle B in the opening Q. When it is desired to rewind the film, the handle is turned outwardly into the position shown in Fig. 4. Before this is done, the stop H is turned from its perpendicular position and said stop is set in a horizontal position, so that it is in alignment with the shaft E, so that, by pushing the reel A toward and over the stop H, the handle can be moved into the operative position shown in Fig. 4. When it is desired to reinsert the handle M into the spindle B, the operation is reversed. The use of the handle M in rewinding the film greatly facilitates the operation of rewinding, which in the case of miniature films, has hitherto been done by hand. The stop H turns with sufficient stiffness upon its pivot, to prevent the spring G from forcing said stop H into the horizontal position. When the handle is in the inoperative position shown in Fig. 2, the shaft E passes through the perforation in arm O, and stop H abuts said arm O, so that the handle is retained in said inoperative or nested position.

The operation of rewinding with my improved handle proceeds as follows:—

Figure 3:
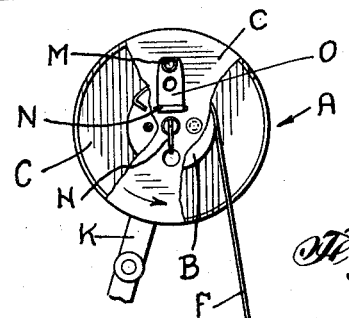
Fig. 3 is a detail side elevation showing the manner in which my improved reel is utilized, the handle of the upper reel being shown in the operative position.

As shown in Fig. 3, the end of the film is inserted in the wooden spindle B in the slot provided therefor. The handle M is then turned in a counterclockwise direction and the film can be rewound on the reel A.

Having fully described my invention, what I claim is:

1. A device for winding or unwinding a motion picture film comprising a reel having an opening therein, a pin extending through said opening so that said reel can be freely turned on said pin, said pin having a stop pivotally connected to the outer end thereof, a crank-handle which is pivotally connected to said reel at a point which is offset with respect to said opening, said crank-handle having an arm having an opening through which said stop is adapted to pass when said stop is parallel to said pin, said reel having an additional recess which the end of said crank-handle is adapted to enter when said crank-handle is moved to the inoperative position, the arm of said crank-handle being between said stop and the adjacent face of the reel when said crank-handle is in the inoperative and said stop is in the operative position.

2. A device for winding or unwinding a motion picture film comprising a reel having an opening therein, a pin extending through said opening so that said reel can be freely turned on said pin, said pin having a stop pivotally connected to the outer end thereof, a crank-handle which is pivotally connected to said reel at a point which is offset with respect to said opening, said crank-handle having an arm having an opening through which said stop is adapted to pass when said stop is parallel to said pin, said reel having an additional recess which the end of said crank-handle is adapted to enter when said crank-handle is moved to the inoperative position, the arm of said crank-handle being between said stop and the adjacent face of the reel when said crank-handle is in the inoperative and said stop is in the operative position, said pin having a spring between the inner end thereof and the adjacent face of the reel.

In testimony whereof I affix my signature.

MAX DAINOW.